United States Patent
Ishikawa (10) Patent No.: US 9,746,065 B2
(45) Date of Patent: Aug. 29, 2017

(54) STRAIN WAVE GEARING HAVING DOUBLE-CONTACT NEGATIVE DEFLECTION TOOTH PROFILE

(71) Applicant: HARMONIC DRIVE SYSTEMS INC., Shinagawa-ku, Tokyo (JP)

(72) Inventor: Shoichi Ishikawa, Yokohama (JP)

(73) Assignee: HARMONIC DRIVE SYSTEM INC., Shinagawa-Ku, Tokyo (JP)

( * ) Notice: Subject to any disclaimer, the term of this patent is extended or adjusted under 35 U.S.C. 154(b) by 239 days.

(21) Appl. No.: 14/767,220

(22) PCT Filed: Nov. 29, 2013

(86) PCT No.: PCT/JP2013/082258
§ 371 (c)(1),
(2) Date: Aug. 11, 2015

(87) PCT Pub. No.: WO2015/079576
PCT Pub. Date: Jun. 4, 2015

(65) Prior Publication Data
US 2016/0003338 A1    Jan. 7, 2016

(51) Int. Cl.
*F16H 49/00* (2006.01)
(52) U.S. Cl.
CPC ..... *F16H 49/001* (2013.01); *F16H 2049/003* (2013.01)
(58) Field of Classification Search
CPC .................................................. F16H 49/001
USPC ............................................................ 74/640
See application file for complete search history.

(56) References Cited

U.S. PATENT DOCUMENTS

| 2,906,143 A | 9/1959 | Musser |
| 5,782,143 A | 7/1998 | Ishikawa |
| 6,526,849 B1 | 3/2003 | Ishikawa |
| 2007/0180947 A1 | 8/2007 | Ishikawa et al. |

(Continued)

FOREIGN PATENT DOCUMENTS

| JP | 45-41171 | 12/1970 |
| JP | 63-115943 A | 5/1988 |

(Continued)

OTHER PUBLICATIONS

International Search Report (PCT/ISA/210) mailed on Feb. 18, 2014, by the Japanese Patent Office as the International Searching Authority for International Application No. PCT/JP2013/082258.

*Primary Examiner* — William C Joyce
(74) *Attorney, Agent, or Firm* — Buchanan Ingersoll & Rooney PC (57) ABSTRACT

The addendum tooth profile of the inner teeth and outer teeth of a strain wave gearing is stipulated by a first and second similar curve obtained from the curve segment from an inflection point to a low point in a movement trajectory when the meshing of both teeth is approximated by rack meshing. The addendum tooth profile of the inner teeth is stipulated by a curve generated at the inner teeth in the process of the addendum profile of the outer teeth moving from the inflection point to the apex of the movement trajectory. The addendum tooth profile of the outer teeth is stipulated by a curve generated at the outer teeth when the addendum profile of the inner teeth moves from the inflection point to the apex. The addendum profile of the outer teeth makes double contact with the addendum profile and dedendum profile of the inner teeth.

4 Claims, 8 Drawing Sheets

(56) References Cited

U.S. PATENT DOCUMENTS

| | | |
|---|---|---|
| 2007/0266819 A1 | 11/2007 | Ishikawa et al. |
| 2011/0237382 A1 | 9/2011 | Ishikawa |
| 2012/0285283 A1 | 11/2012 | Ishikawa |

FOREIGN PATENT DOCUMENTS

| | | |
|---|---|---|
| JP | 64-79448 A | 3/1989 |
| JP | 2001-146945 A | 5/2001 |
| JP | 2007-211907 A | 8/2007 |
| JP | 2011-144916 A | 7/2011 |
| WO | WO 96/19683 A1 | 6/1996 |
| WO | WO 2005/124189 A1 | 12/2005 |
| WO | WO 2010/070712 A1 | 6/2010 |
| WO | WO 2012/153363 A1 | 11/2012 |

STRAIN WAVE GEARING HAVING DOUBLE-CONTACT NEGATIVE DEFLECTION TOOTH PROFILE

TECHNICAL FIELD

The present invention relates to an improvement in the tooth profiles of a rigid internally toothed gear and a flexible externally toothed gear in a strain wave gearing. Specifically, the present invention relates to a flat strain wave gearing having a double-contact negative deflection tooth profile in which the two gears mesh in a wide range in multiple axially perpendicular cross-sections of the tooth trace direction. The present invention also relates to a cup-shaped or top-hat-shaped strain wave gearing having a double-contact or three-dimensional-contact negative deflection tooth profile in which the two gears mesh over a wide range in multiple axially perpendicular cross-sections of the tooth trace direction, and mesh approximately continuously through the entire tooth trace direction.

BACKGROUND ART

Commonly, strain wave gearings have a rigid internally toothed gear, a flexible externally toothed gear coaxially disposed on the inner side of the internally toothed gear, and a wave generator fitted to the inner side of the externally toothed gear. Flat strain wave gearings comprise a flexible externally toothed gear in which external teeth are formed in the external peripheral surface of a flexible cylinder. The flexible externally toothed gears of cup-shaped and top-hat-shaped strain wave gearings comprise a flexible cylindrical barrel part, a diaphragm extending radially from the rear end of the cylindrical barrel part, and external teeth formed in the external peripheral surface portion of the front-end-opening side of the cylindrical barrel part. In a typical strain wave gearing, the circular flexible externally toothed gear is made to flex into an ellipsoidal shape by the wave generator, and both major-axis-directional ends of the ellipsoidally flexed flexible externally toothed gear mesh with the rigid internally toothed gear.

Since its invention by C. W. Musser (Patent Document 1), the strain wave gearing has been contrived in a variety of inventions and designs by many researches including the present inventor, as well as Musser himself. There are even a variety of inventions related merely to the tooth profile of strain wave gearings. In Patent Document 2, the present inventor proposed using the basic tooth profile as an involute tooth profile, and in Patent Documents 3 and 4 proposed using a technique in which a rack is used to approximate the meshing of the teeth of a rigid internally toothed gear and a flexible externally toothed gear as a tooth-profile-designing method for deriving an addendum tooth profile of both gears, which have a large area of contact.

In the tooth portion of an ellipsoidally flexed flexible externally toothed gear of a cup-shaped or top-hat-shaped strain wave gearing, the amount of radial flexure increases along the tooth trace direction from the diaphragm side toward the front-end opening, substantially in proportion to the distance from the diaphragm. As the wave generator rotates, various portions of the tooth part of the flexible externally toothed gear repeatedly flex radially outward and inward. To date, sufficient consideration has not been given to reasonable methods for designing a tooth profile in a manner that takes into consideration such flexural action (coning) of the flexible externally toothed gear caused by the wave generator.

In Patent Document 5, the present inventor proposed a strain wave gearing comprising a tooth profile by which continuous meshing is possible, with consideration given to coning of the teeth. In the strain wave gearing proposed in Patent Document 5, an arbitrary axially perpendicular cross-section of the tooth trace direction of the flexible externally toothed gear is selected as a principal cross-section, and at major-axis positions of an ellipsoidal rim neutral line of the flexible externally toothed gear in the principal cross-section, the amount of flexure $2\kappa mn$ (where $\kappa$ is a flexure coefficient, m is the module, and n is a positive integer) with respect to a rim neutral circle prior to flexure is set so that the gear flexes in a non-deflection state of $2mn$ ($\kappa=1$).

Using rack meshing to approximate meshing of the flexible externally toothed gear and the rigid internally toothed gear, in axially perpendicular cross-sections at positions including the principal cross-section in the tooth trace direction of the flexible externally toothed gear, movement loci of the teeth of the flexible externally toothed gear with respect to the teeth of the rigid internally toothed gear as the wave generator rotates are derived, a first homothetic curve BC is derived by scaling down, by a ratio $\lambda$ ($\lambda<1$) using a point B as the homothetic center, a curve segment extending from a point A of an apical part to the point B in the next bottom part in a non-deflection movement locus obtained in the principal cross-section, and this first homothetic curve BC is adopted as the basic tooth profile for the addendum of the rigid internally toothed gear.

Furthermore, a second homothetic curve is derived by scaling, by a ratio $(1-\lambda)/\lambda$ using an end point C of the first homothetic curve BC as the homothetic center, of a curve obtained by 180 degree rotation of the first homothetic curve BC about the end point C, and this second homothetic curve is adopted as the basic tooth profile for the addendum of the flexible externally toothed gear.

Additionally, in the tooth profile of the flexible externally toothed gear, an addendum modification is applied to the tooth profile portions on both sides of the principal cross-section in the tooth trace direction, so that both negative-deflection-side movement loci, which are obtained in axially perpendicular cross-sections flexed to a negative deflection state (flexural coefficient $\kappa<1$) toward the diaphragm side from the principal cross-section, and positive-deflection-side movement loci, which are obtained in axially perpendicular cross-sections flexed to a positive deflection state (flexural coefficient $\kappa>1$) toward the front-end-opening side from the principal cross-section, describe curves tangent to the bottom part of the non-deflection movement locus in the principal cross-section.

In a strain wave gearing in which a tooth profile is formed in this manner, not only can continuous meshing be achieved over a wide range between the addendum tooth profiles of the external teeth and internal teeth in a principal cross-section of the two gears, but effective meshing between the addendum tooth profiles of the external teeth and internal teeth through the entire range of the tooth trace direction can be achieved as well. Consequently, greater torque can be transmitted in comparison to a conventional strain wave gearing in which meshing takes place over a narrow tooth trace range.

PRIOR ART DOCUMENTS

Patent Documents

[Patent Document 1] U.S. Pat. No. 2,906,143
[Patent Document 2] JP 45-41171 B

[Patent Document 3] JP 63-115943 A
[Patent Document 4] JP 64-79448 A
[Patent Document 5] WO 2010/070712

DISCLOSURE OF THE INVENTION

Problems to be Solved by the Invention

Market demand is increasing for the improvement of load torque performance in strain wave gearings. To achieve this, the tooth profiles of the gears of a strain wave gearing must be reasonable tooth profiles that can continuously mesh together over a wider range than in the past.

In view of the foregoing, a problem of the present invention is to achieve a strain wave gearing comprising tooth profiles such that not only can the addendum tooth profiles of the external teeth and internal teeth mesh together, but the tooth profiles can mesh over a wider range as well.

Means Used to Solve the Above-Mentioned Problems

To solve the problems described above, a strain wave gearing of the present invention is characterized in that the tooth profiles of a flexible externally toothed gear and a rigid internally toothed gear are set so that the addendum tooth profile of the flexible externally toothed gear comes in contact (double contact) with the dedendum tooth profile and the addendum tooth profile of the rigid internally toothed gear, and the addendum tooth profile of the rigid internally toothed gear comes in contact (double contact) with the dedendum tooth profile and the addendum tooth profile of the flexible externally toothed gear.

A cup-shaped or top-hat-shaped strain wave gearing of the present invention is characterized in that: the tooth profiles of a flexible externally toothed gear and a rigid internally toothed gear are set so that near the tooth trace center of the flexible externally toothed gear, the addendum tooth profile of the flexible externally toothed gear comes in contact (double contact) with the dedendum tooth profile and the addendum tooth profile of the rigid internally toothed gear, and the addendum tooth profile of the rigid internally toothed gear comes in contact (double contact) with the dedendum tooth profile and the addendum tooth profile of the flexible externally toothed gear; and addendum modifications are applied to the tooth profiles of both gears so that the addendum tooth profile of the flexible externally toothed gear meshes with the addendum tooth profile of the rigid internally toothed gear across the entire tooth trace.

Specifically, a strain wave gearing having a double-contact negative deflection tooth profile of the present invention is characterized in comprising:

a rigid internally toothed gear (2), a flexible externally toothed gear (3) coaxially disposed on the inner side of the internally toothed gear, and a wave generator (4) fitted to the inner side of the externally toothed gear;

the flexible externally toothed gear (3) being made to flex into an ellipsoidal shape by the wave generator (4) and external teeth (34) of the ellipsoidally flexed flexible externally toothed gear being meshed with internal teeth (24) of the rigid internally toothed gear (2) at both ends in the major axis direction;

the rigid internally toothed gear (2) and the flexible externally toothed gear (3) prior to ellipsoidal deformation both being spur gears having a module m;

the number of teeth of the flexible externally toothed gear (3) being 2n fewer than the number of teeth of the rigid internally toothed gear (2) where n is a positive integer;

the amount of flexure with respect to a rim neutral circle prior to flexure being 2κmn, where κ is a flexure coefficient, at a major axis position (L1) in an ellipsoidal rim neutral line of the flexible externally toothed gear (3) in an axially perpendicular cross-section at any position in the tooth trace direction of the external teeth (34);

the external teeth (34) having a negative deflection tooth profile with a flexure coefficient κ such that 0<κ<1;

the internal teeth (24) having an addendum tooth profile defined by a first homothetic curve and a dedendum tooth profile defined by a first-tooth-profile-creating curve;

the external teeth (34) having an addendum tooth profile defined by a second homothetic curve and a dedendum tooth profile defined by a second-tooth-profile-creating curve;

the first and second homothetic curves being obtained on the basis of a movement locus (Mc) of the external teeth (34) relative to the internal teeth (24) while the wave generator (4) rotates, at different positions of the external teeth (34) in the tooth trace direction, when the meshing of the external teeth (34) and the internal teeth (24) is approximated with rack meshing;

the first homothetic curve being a curve segment from one vertex (D) to the next bottom point (B) of the movement locus (Mc), and a first curve segment (AB) from an inflection point (A) to the bottom point (B) in the curve segment being derived by scaling down by a ratio λ (0<λ<1) with the bottom point (B) as the homothetic center;

the second homothetic curve being derived by scaling, by a ratio (1-λ)/λ using an end point (C) of the first homothetic curve BC as the homothetic center, of a curve obtained by 180 degree rotation of the first homothetic curve (BC) about the end point (C) on the side opposite the bottom point (B) in the first homothetic curve (BC);

the first-tooth-profile-creating curve being created in the internal teeth (24) in the process of the addendum tooth profile of the external teeth, defined by the second homothetic curve (AC), moving from the inflection point (A) of the movement locus (Mc) to the vertex (D) in the movement locus (Mc); and the second-tooth-profile-creating curve being created in the external teeth (34) when the addendum tooth profile of the internal teeth, defined by the first homothetic curve (BC), moves from the inflection point (A) to the vertex (D).

The cup-shaped or top-hat-shaped flexible externally toothed gear (3) comprises a flexible cylindrical barrel part (31) and a diaphragm (32) extending radially from the rear end of the cylindrical barrel part (31), and the external teeth (34) are formed in the external peripheral surface portion of the cylindrical barrel part (31) on the same side as a front-end opening (31a). The amount of flexure of the external teeth (34) increases along the tooth trace direction from an inner end part (34b) on the same side as the diaphragm (32) toward an open end part (34a) on the same side as the front-end opening (31a), in proportion to the distance from the diaphragm (32).

In this case, in the strain wave gearing (1) of the present invention, when any position of the external teeth (34) in the tooth trace direction between the open end part (34a) and the inner end part (34b) is designated as the principal cross-section position, the tooth profile of the external teeth (34) in the principal cross-section position is the basic external tooth profile defined by the first homothetic curve and the first-tooth-profile-creating curve. The tooth profile shape of the external teeth (34) in a position in the tooth trace direction other than the principal cross-section position is an addendum-modified tooth profile, obtained by applying an addendum modification according to the amount of flexure to the basic external tooth profile. Specifically, the tooth profile shape of the external teeth (34) in different positions in the tooth trace direction from the principal cross-section position to the open end part (34a) is obtained by applying an addendum modification so that the vertex of the movement locus described by the basic external tooth profile in the different positions is tangent to the vertex of the movement locus (Mc) in the principal cross-section position, and the tooth profile shape of the external teeth (34) in different positions in the tooth trace direction from the principal cross-section position to the inner end part (34b) is obtained by applying an addendum modification so that the vertex of the movement locus described by the basic external tooth profile in the different positions is tangent to the bottom part of the movement locus (Mc) in the principal cross-section position.

Preferably, corrections are made to both the dedendum tooth profile of the internal teeth (24) and the dedendum tooth profile of the external teeth (34) so as to preserve the desired clearance between the opposing addendum tooth profiles.

BRIEF DESCRIPTION OF THE DRAWINGS

FIGS. 7(a), (b), and (c) are explanatory drawings showing movement loci of the teeth of the flexible externally toothed gear, and rack-approximated meshing of the flexible externally toothed gear and the rigid internally toothed gear, in the open end part, the principal cross-section, and the inner end part, respectively.

BEST MODE FOR CARRYING OUT THE INVENTION (Configuration of Strain Wave Gearing)

Figure 1:
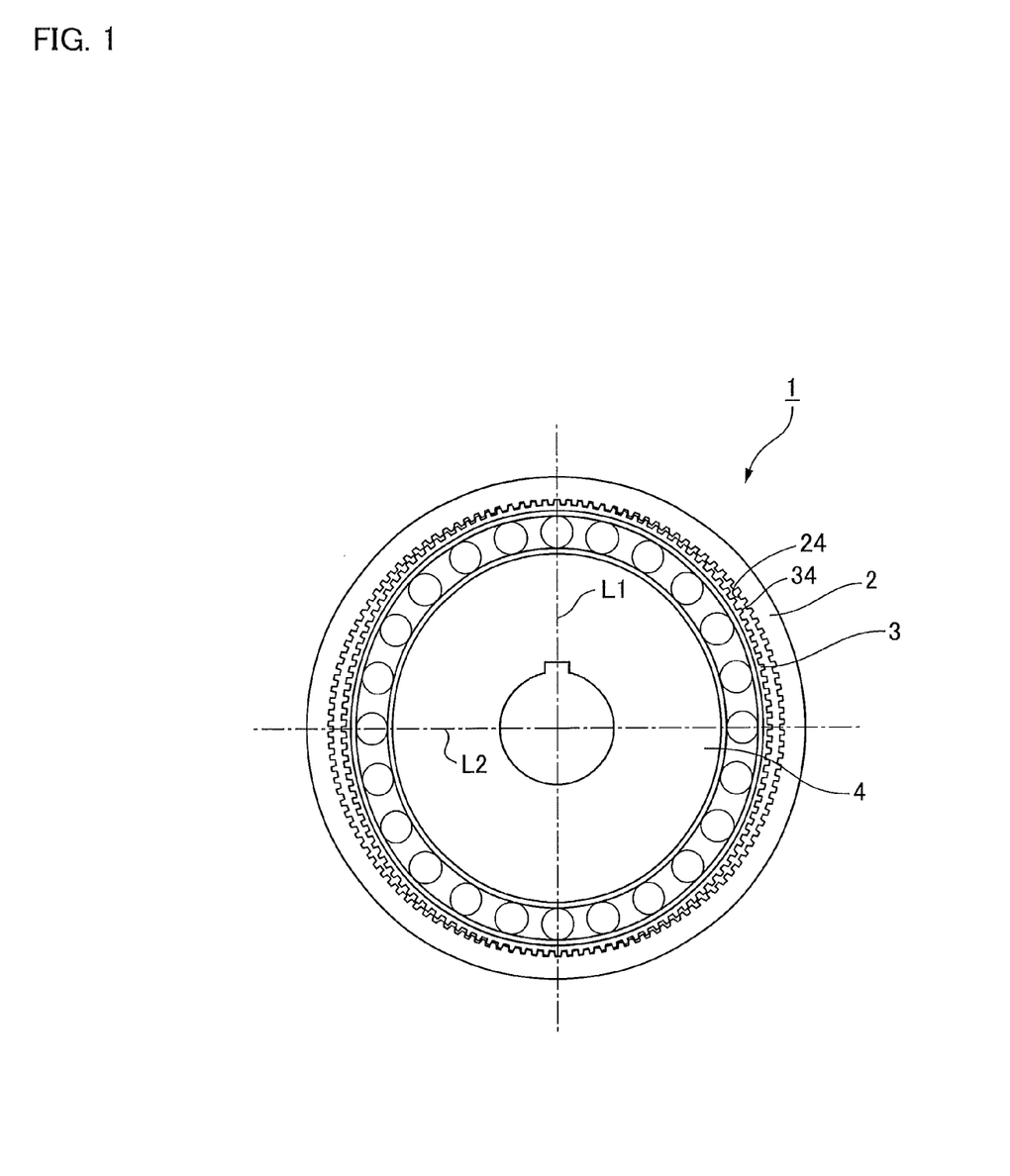
FIG. 1 is a schematic front view showing an example of a strain wave gearing to which the present invention is applied.
Figure 2:
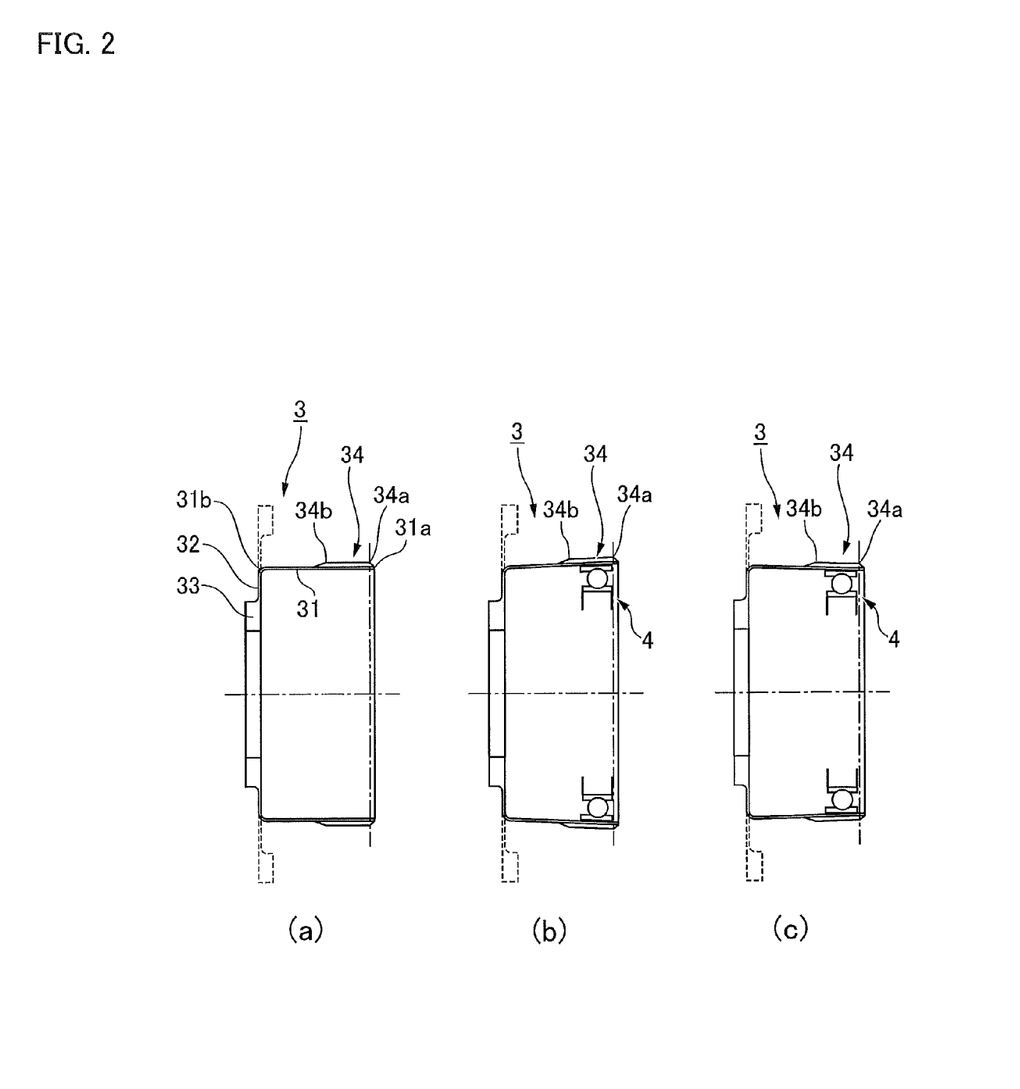
FIG. 2 includes explanatory drawings showing the manner in which cup-shaped and top-hat-shaped flexible externally toothed gears flex, (a) showing states before deformation, (b) showing the states of cross-sections including the major axes of the flexible externally toothed gears deformed into ellipsoidal shapes, and (c) showing the states of cross-sections including the minor axes of the flexible externally toothed gears deformed into ellipsoidal shapes.

FIG. 1 is a front view of a strain wave gearing, the subject of the present invention. FIGS. 2(a) to (c) are cross-sectional views showing the manner in which the flexible externally toothed gear opening flexes into an ellipsoidal shape, FIG. 2(a) showing the state before deformation, FIG. 2(b) showing a cross-section including the major axis of the ellipsoidal shape after deformation, and FIG. 2(c) showing a cross-section including the minor axis of the ellipse after deformation. In FIGS. 2(a) to (c), the solid lines show the diaphragm and boss portions of a cup-shaped flexible externally toothed gear, and the dashed lines show the diaphragm and boss portions of a top-hat-shaped flexible externally toothed gear.

As shown in these drawings, a strain wave gearing 1 has an annular rigid internally toothed gear 2, a flexible externally toothed gear 3 disposed on the inner side of the internally toothed gear, and a wave generator 4 having an ellipsoidal contour and fitted to the inner side of the externally toothed gear. The rigid internally toothed gear 2 and the non-deformed flexible externally toothed gear 3 are spur gears having a module m. The difference in the number of teeth between the rigid internally toothed gear 2 and the flexible externally toothed gear 3 is 2n (n being a positive integer), and the circular flexible externally toothed gear 3 of the strain wave gearing 1 is made to flex into an ellipsoidal shape by the wave generator 4 having an ellipsoidal contour. The flexible externally toothed gear 3, flexed into an ellipsoidal shape, meshes with the rigid internally toothed gear 2 near the end portions in the major-axis L1 direction of the flexible externally toothed gear 3.

When the wave generator 4 is rotated, the meshing positions of the two gears 2, 3 move in the circumferential direction, and relative rotation occurs between the two gears 2, 3, according to the difference in the number of teeth between the two gears. The flexible externally toothed gear 3 comprises a flexible cylindrical barrel part 31, a diaphragm 32 extending in the radial direction and continuous with a rear end 31b which is one end of the cylindrical barrel part 31, a boss 33 continuous with the diaphragm 32, and external teeth 34 formed in the external peripheral surface portion in the same side as an open end 31a which is the other end of the cylindrical barrel part 31.

The ellipsoidally contoured wave generator 4 is fitted into the internal peripheral surface portion of the external-teeth-forming-portion of the cylindrical barrel part 31. The wave generator 4 causes the amount of radially outward or inward flexure in the cylindrical barrel part 31 to gradually increase from the rear end 31b on the same side as the diaphragm toward the open end 31a. In a cross-section including the major axis L1 of the ellipsoidal curve as shown in FIG. 2(b), the amount of outward flexure gradually increases in proportion to the distance from the rear end 31b toward the open end 31a. In a cross-section including the minor axis L2 of the ellipsoidal curve as shown in FIG. 2(c), the amount of inward flexure gradually increases in proportion to the distance from the rear end 31b toward the open end 31a. In the external teeth 34 formed in the external peripheral surface portion on the same side as the open end 31a, from an inner end part 34b of the tooth trace direction toward an open end part 34a on the same side as the opening, the amount of flexure increases in proportion to the distance from the rear end 31b.

In an axially perpendicular cross-section of any position in the tooth trace direction of the external teeth 34, a circle passing through the thickness-directional middle of the root rim of the external teeth 34 before ellipsoidal flexure is a rim neutral circle. An ellipsoidal curve passing through the thickness-directional middle of the root rim after ellipsoidal flexure is referred to as a rim neutral curve. The amount of flexure w in the major axis direction with respect to the rim neutral circle at the major axis positions of the ellipsoidal rim neutral curve is expressed as 2κmn, where κ (a real number including 1) is a flexure coefficient. The tooth profile of the flexible externally toothed gear 3 of the present invention is a negative deflection tooth profile, and the flexure coefficient κ of the open end 31a is set to 0<κ<1.

Specifically, with $Z_F$ denoting the number of external teeth 34 of the flexible externally toothed gear 3, $Z_C$ denoting the number of internal teeth 24 of the rigid internally toothed gear 2, and R ($=Z_F/(Z_C-Z_F)=Z_F/2n$) denoting the reduction ratio of the strain wave gearing 1, the value obtained by dividing the pitch diameter $mZ_F$ of the flexible externally toothed gear 3 by the reduction ratio R ($mZ_F/R=2mn$) is designated as the normal (standard) amount of flexure $w_O$ in the major axis direction. The strain wave gearing 1 is generally designed so as to flex by the normal amount of flexure $w_O$ (=2 nm) in the locations in the tooth trace direction of the flexible externally toothed gear 3 where the ball centers of the wave bearing of the wave generator 4 are positioned. The flexure coefficient κ represents a value obtained by dividing the amount of flexure w in different axially perpendicular cross-sections in the tooth trace direction of the flexible externally toothed gear 3 by the normal amount of flexure. Therefore, in the external teeth 34, the flexure coefficient of a position where the normal amount of flexure $w_O$ is obtained is κ=1, the flexure coefficient of a position in a cross-section of a lesser amount of flexure w is κ<1, and the flexure coefficient of a position in a cross-section of a greater amount of flexure w is κ>1. The tooth profile in which the normal amount of flexure $w_O$ (κ=1) in the external teeth 34 is obtained is referred to as the standard deflection tooth profile, the tooth profile in which an amount of flexure less than the normal amount of flexure (κ<1) is obtained is referred to as the negative deflection tooth profile, and the tooth profile in which an amount of flexure greater than the normal amount of flexure (κ>1) is obtained is referred to as the positive deflection tooth profile. As was previously described, the external teeth 34 of the flexible externally toothed gear 3 of the present invention are designed as having a negative deflection tooth profile.

Figure 3A:
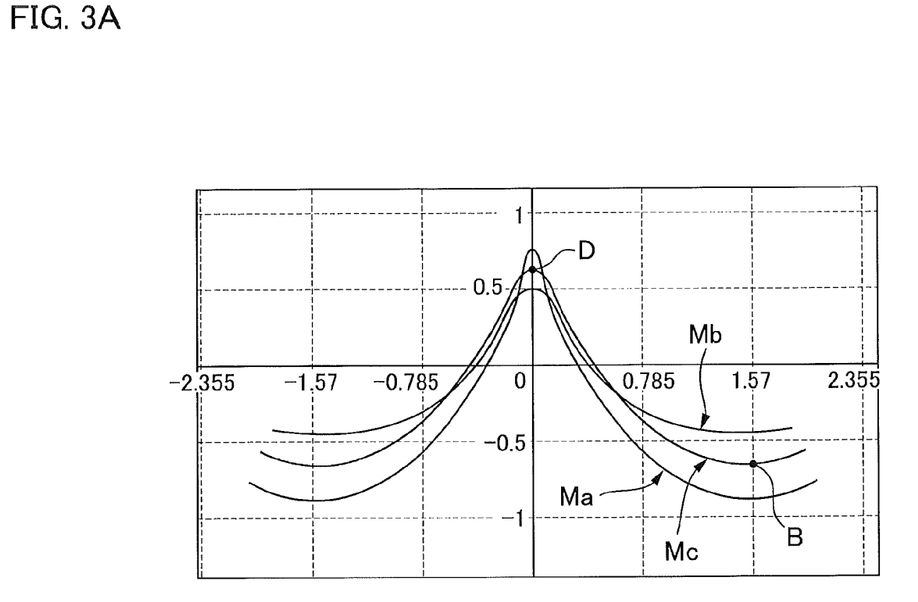
FIG. 3A is a graph showing movement loci of the external teeth obtained when the relative motions of the two gears are approximated with a rack at positions of the inner end part, the principal cross-section, and the open end part in the tooth trace direction of the external teeth.

FIG. 3A is a drawing showing movement loci of the external teeth 34 of the flexible externally toothed gear 3 relative to the internal teeth 24 of the rigid internally toothed gear 2, obtained when the relative motions of the two gears 2, 3 of the strain wave gearing 1 are approximated with a rack. In this graph, the x-axis represents the translation direction of the rack, and the y-axis represents a direction perpendicular thereto. The origin on the y-axis is the average position of the amplitude of the movement loci. The curve Ma is a movement locus obtained in the open end part 34a of the external teeth 34, and the curve Mb is a movement locus obtained in the inner end part 34b. The curve Mc is a movement locus obtained at any position in the tooth trace direction from the open end part 34a to the inner end part 34b, and in the present example, the curve Mc is obtained in the middle of the tooth trace direction (this position is referred to below as the "principal cross-section position"). The movement loci of the external teeth 34 of the flexible externally toothed gear 3 relative to the internal teeth 24 of the rigid internally toothed gear 2 are expressed by the following formula.

$x=0.5mn(\theta-\kappa \sin \theta)$ $y=\kappa mn \cos \theta$

To simplify the description, assuming the module m=1 and n=1 (difference in number of teeth 2n=2), the above formula is represented by the following formula 1.

$x=0.5(\theta-\kappa \sin \theta)$ $y=\kappa \cos \theta$ (Formula 1)

(Method for Forming Tooth Profile in Principal Cross-Section Position)

Figure 4:
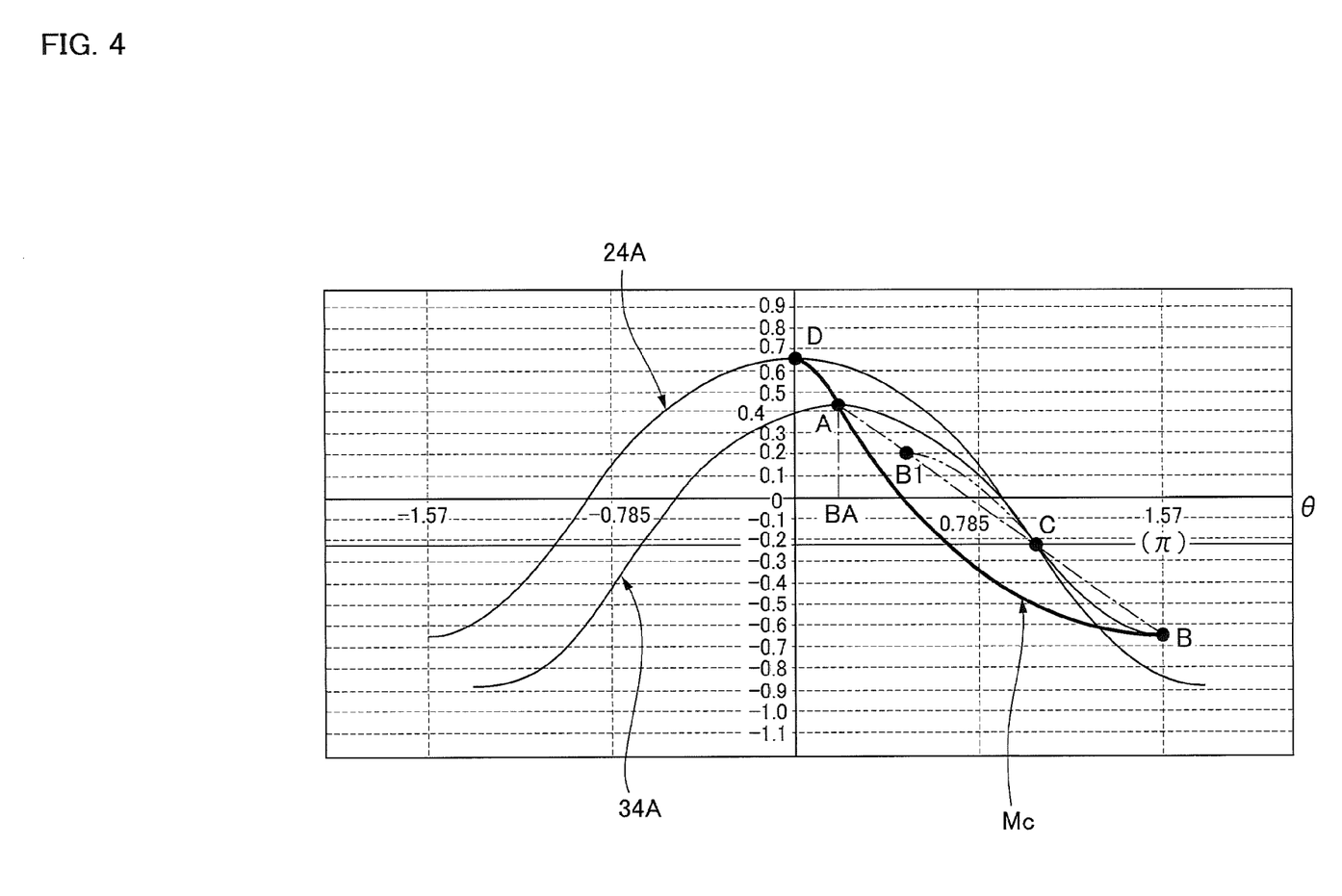
FIG. 4 is an explanatory drawing showing homothetic curves defining the basic tooth profiles of the addendums of the two gears, derived from the movement locus of the external teeth in the principal cross-section position of the flexible externally toothed gear.

FIG. 4 is an explanatory drawing showing the principle of forming a rack tooth profile of the external teeth 34 and internal teeth 24 in the principal cross-section position. In the present invention, a movement locus Mc obtained in the principal cross-section position in the flexible externally toothed gear 3 is utilized in order to define the addendum tooth profile in the principal cross-section position.

First, in the movement locus Mc shown by the thick solid line of FIG. 4, the parameter θ exhibits a first curve AB from π to $\theta_A$. The position where the parameter θ is equal to π is point B, the lowest point of the movement locus Mc, and the position where the parameter θ is equal to $\theta_A$ is point A, the inflection point of the movement locus Mc. Next, the first curve AB is homothetically transformed by a ratio λ (0<λ<1) using point B as the homothetic center, obtaining a first homothetic curve BC. The first homothetic curve BC is adopted for the addendum tooth profile of the internal teeth 24 of the rigid internally toothed gear 2. FIG. 4 shows a case in which λ is equal to 0.4.

Next, using point C as the homothetic center, point C being the end point on the side opposite point B in the first homothetic curve BC, the first homothetic curve BC is rotated 180 degrees, obtaining the curve $B_1C$ shown by an imaginary line. This curve $B_1C$ is homothetically transformed by a ratio (1−λ)/λ using point C as the homothetic center, obtaining a second homothetic curve CA. This second homothetic curve CA is adopted for the basic addendum tooth profile of the external teeth 34 of the flexible externally toothed gear 3.

The addendum tooth profiles set in this manner, when written as formulas, are expressed in the following formulas 2 and 3.

<Basic Formula of Addendum Tooth Profile of Rigid Internally Toothed Gear>

$x(\theta)=0.5\{(1-\lambda)\pi+\lambda(\theta-\kappa \sin \theta)\}$ $y(\theta)=\kappa\{\lambda(1+\cos \theta)-1\}$ $(\theta_A \leq \theta \leq \pi)$ (Formula 2)

<Basic Formula of Addendum Tooth Profile of Flexible Externally Toothed Gear>

$x(\theta)=0.5\{(1-\lambda)(\pi-\theta+\kappa \sin \theta)+\theta_A-\kappa \sin \kappa_A\}$ $y(\theta)=\kappa\{\cos \theta_A-(1-\lambda)(1+\cos \theta)\}$ $(\theta_A \leq \theta \leq \pi)$ (Formula 3)

While the addendum tooth profile of the flexible externally toothed gear 3 is moving from point D, the vertex of the movement locus Mc, to point A, the inflection point, the curve created in the rigid internally toothed gear 2 is established as the basic dedendum tooth profile of the rigid internally toothed gear 2. This dedendum tooth profile is given by the following formula 4, which is derived from formulas 1 and 3.

$x(\theta)=0.5\{(1-\lambda)(\pi-\theta+\kappa \sin \theta)+\kappa(\sin \theta_A-\sin \theta)-(\theta_A/\pi)\theta+\theta_A-\kappa \sin \theta_A\}$ $y(\theta)=\kappa\{\cos \theta-(1-\lambda)(1+\cos \theta)\}$ (Formula 4)

Similarly, while the addendum tooth profile of the flexible externally toothed gear 3 is moving from point D, the vertex of the movement locus Mc, to point A, the inflection point, the curve created in the flexible externally toothed gear by the addendum tooth profile of the rigid internally toothed gear 2 is established as the basic dedendum tooth profile of the flexible externally toothed gear. This dedendum tooth profile is given by the following formula 5, which is derived from formulas 1 and 2.

$x(\theta)=0.5\{(1-\lambda)(\pi+\lambda(0-\kappa\sin 0)-\kappa(\sin\theta_A-\sin\theta)+(\theta_A/\pi)\theta\}$ $y(\theta)=\kappa\{\lambda(1+\cos\theta)-1+\cos\theta_A-\cos\theta\}$ (Formula 5)

The curve 24A shown in FIG. 4 represents the shape of internal teeth 24 having the addendum tooth profile and dedendum tooth profile set in the manner described above, and the curve 34A represents the shape of external teeth 34 having the addendum tooth profile and dedendum tooth profile set in the manner described above. The actual dedendum tooth profiles of the two gears 2, 3 are obtained by correcting the basic dedendum tooth profiles established as described above in order to ensure clearance with the tooth tips of the opposing gear.

The tooth profile of the rigid internally toothed gear 2, which is the same shape in the tooth trace direction, is defined by the above-described addendum tooth profile and a corrected dedendum tooth profile, which is the above-described dedendum tooth profile corrected in order to ensure clearance with the tooth tips of the external teeth.

In the case of a flat strain wave gearing, the tooth profile of the flexible externally toothed gear 3 is, similar to the case of the rigid internally toothed gear, defined by the above-described addendum tooth profile and a corrected dedendum tooth profile, which is the dedendum tooth profile established as described above, corrected in order to ensure clearance with the tooth tips of the internal teeth. In other words, the tooth profile shape is the same in different positions of the tooth trace direction.

In the case of a cup-shaped or top-hat-shaped flexible externally toothed gear used in a cup-shaped or top-hat-shaped strain wave gearing, the tooth profile in the principal cross-section position is defined by the above-described addendum tooth profile and a corrected dedendum tooth profile, which is the dedendum tooth profile established as described above, corrected in order to ensure clearance with the tooth tips of the internal teeth. Tooth profiles in positions other than the principal cross-section position are regarded as addendum-modified tooth profiles, which are obtained by applying an addendum modification according to the amount of flexure to the tooth profile of the principal cross-section position, as described below.

(Method for Forming External Tooth Profile in Position Other Than Principal Cross-Section Position)

An addendum modification according to the value of the flexure coefficient κ is applied to the tooth profile of the flexible externally toothed gear 3, from the principal cross-section position of the external teeth 34 to the open end part 34a, and also from the principal cross-section position to the inner end part 34b. Denoting the addendum modification amount applied to the external teeth 34 as mnh, the addendum modification amount is h when m=1 and n=1. Denoting the flexure coefficient in the principal cross-section position as $\kappa_A$, the movement loci and addendum modification amounts of different positions in the tooth trace direction of the addendum-modified tooth profile are shown in the following formula 1A.

$x=0.5(\theta-\kappa\sin\theta)$ $y=\kappa\cos\theta+h$ $h=-|\kappa_A-\kappa|$ (Formula 1A)

Figure 3B:
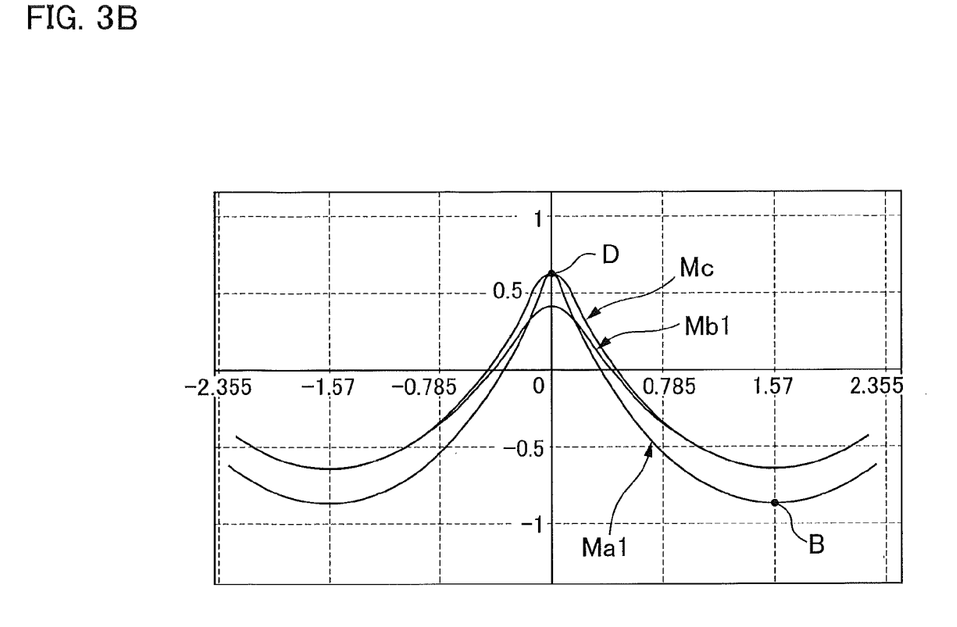
FIG. 3B is a graph showing movement loci of addendum-modified external teeth obtained when the relative motions of the two gears are approximated with a rack at positions of the inner end part, the principal cross-section, and the open end part in the tooth trace direction of the external teeth.

This addendum modification causes the movement locus Ma of the open end part 34a and the movement locus Mb of the inner end part 34b shown in FIG. 3A to change to the movement loci Ma1, Mb1, respectively, shown in FIG. 3B. Specifically, from the principal cross-section position to the open end part 34a, the vertices of the movement loci at different positions of the external teeth 34 coincide with the vertex of the movement locus Mc of the principal cross-section position. From the principal cross-section position to the inner end part 34b, the vertices of the movement loci at different positions of the external teeth 34 coincide with the bottom of the movement locus Mc of the principal cross-section position.

Thus, in the flexible externally toothed gear 3, tooth profiles at positions other than the principal cross-section position are addendum-modified tooth profiles, obtained by applying an addendum modification of an addendum modification amount h, given by the third formula of formula 1A, to the tooth profile at the principal cross-section position.

Figure 5:
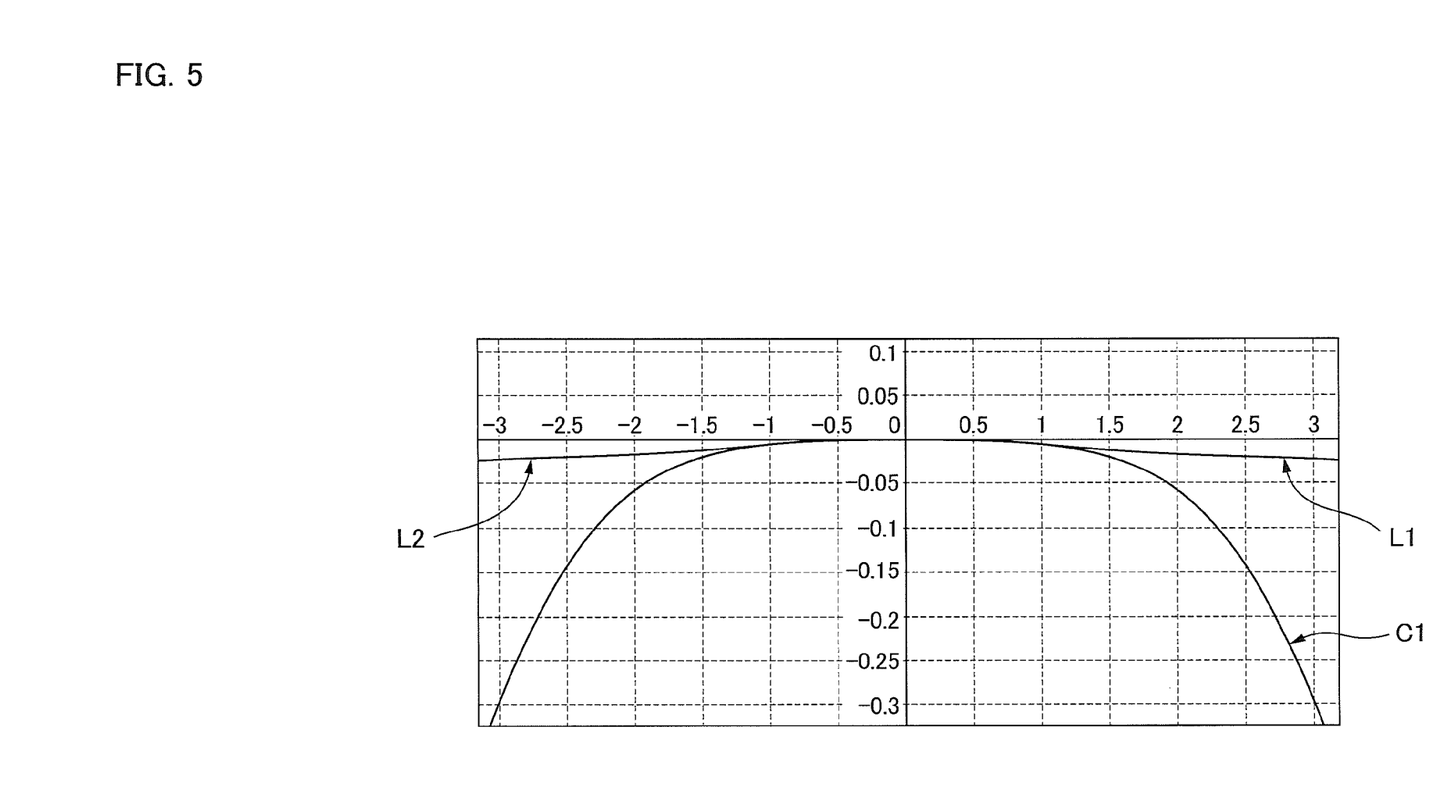
FIG. 5 is a graph showing the shape of the middle vicinity of the tooth trace of the flexible externally toothed gear.

FIG. 5 is a graph showing an example of the addendum modification amount near the center of the tooth trace direction of the flexible externally toothed gear 3. The horizontal axis in this graph represents the distance from the center of the tooth trace direction of the external teeth 34 (the principal cross-section position), and the vertical axis represents the addendum modification amount h. The addendum modification amount h is represented by addendum modification straight lines L1, L2 having the same slope. The addendum modification straight line L1 represents the addendum modification amount from the principal cross-section position to the open end part 34a, and the addendum modification straight line L2 represents the addendum modification amount from the principal cross-section position to the inner end part 34b.

FIG. 5 shows a quartic curve C1 tangent to the addendum modification straight lines L1, L2, the vertex being the principal cross-section position. When the addendum modification amounts of different positions are decided on the basis of this quartic curve C1, a substantially flat part is formed in the tooth-trace-directional center portion including the principal cross-section position in the external teeth 34, the addendum modification is therefore guaranteed to be a smooth change, and the dimensions are easily managed when the flexible externally toothed gear 3 is being cut.

Figure 6:
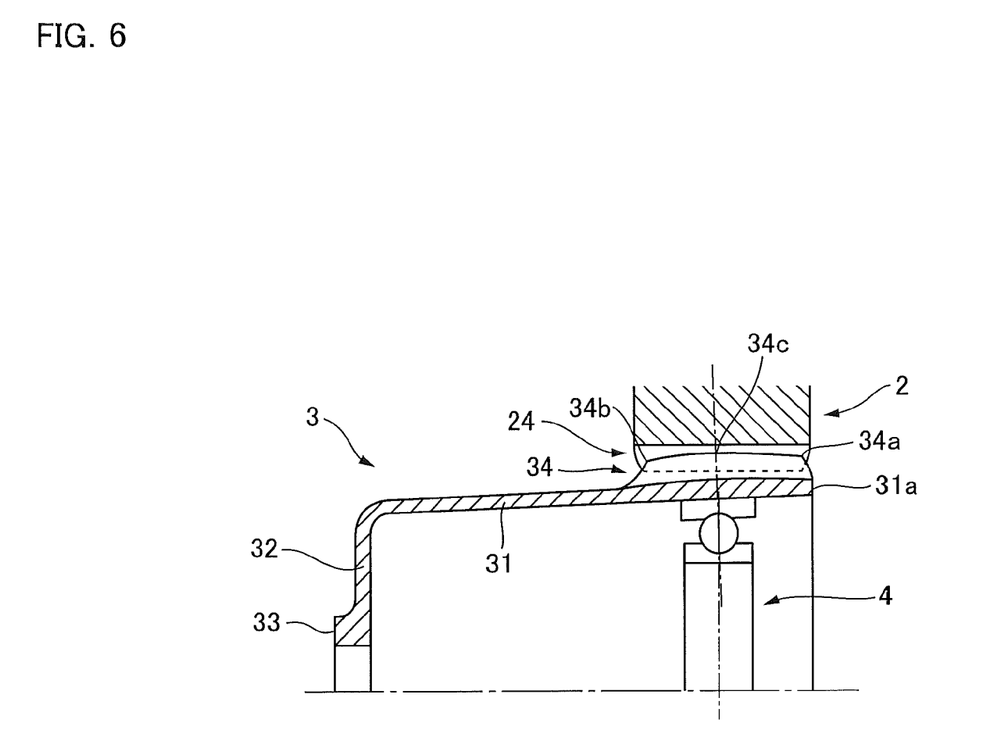
FIG. 6 is an explanatory drawing showing the contour in the tooth trace direction of a tooth of the addendum-modified flexible externally toothed gear.

FIG. 6 is an explanatory drawing showing the tooth profile contours along the tooth trace direction of the external teeth 34 and the internal teeth 24. This drawing shows the state of a cross-section including the major axis when the two gears are meshed (the state of deepest meshing). The tooth profile contour of the external teeth 34 in the tooth trace direction is defined by the above-described quartic curve C1 in the tooth-trace-directional center portion including the principal cross-section position 34c, by the addendum modification straight line L1 in the portion from this center portion to the open end part 34a, and by the addendum modification straight line L2 in the portion from the center portion to the inner end part 34b.

Figure 7:
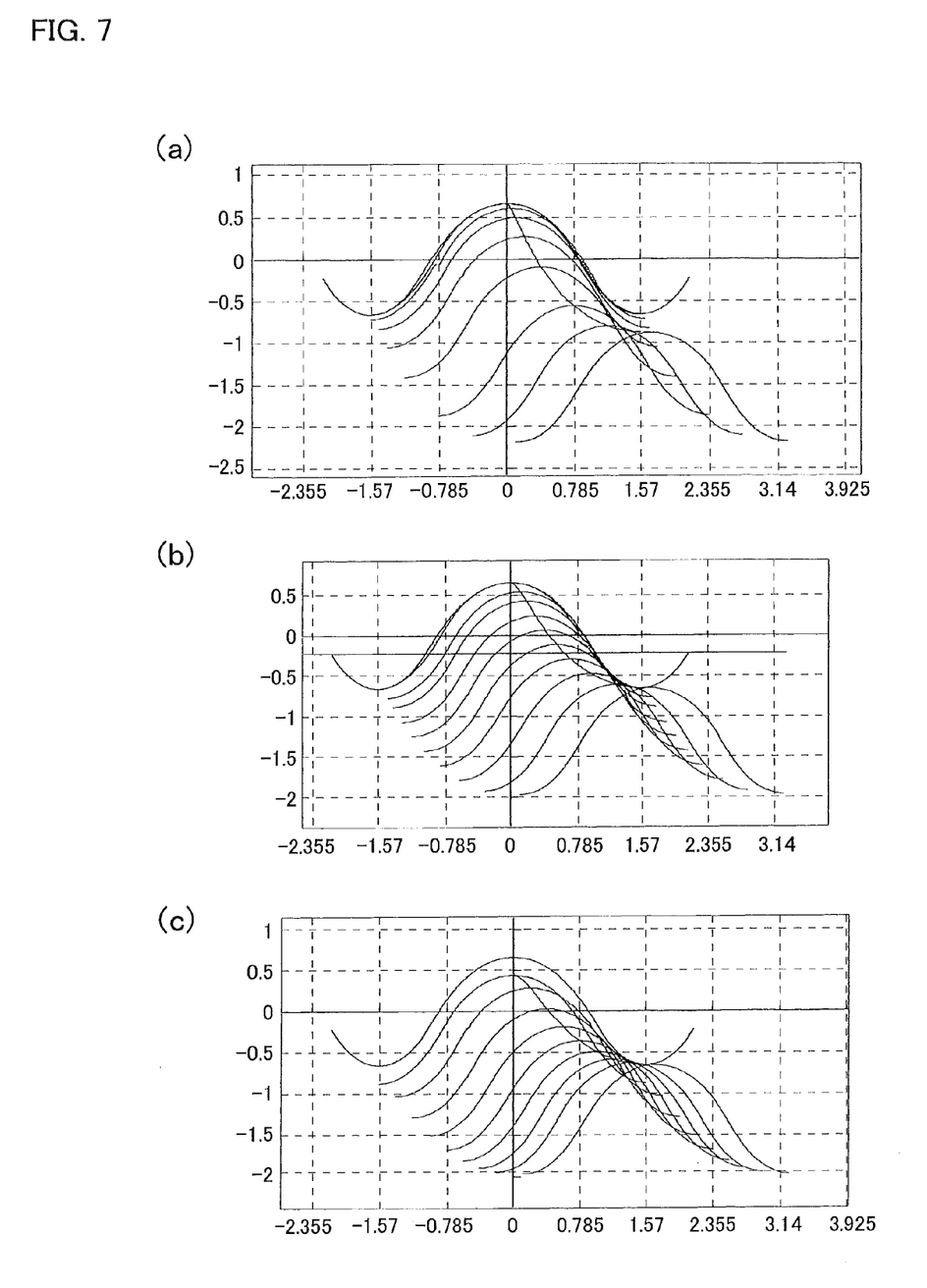

FIGS. 7(a), (b), and (c) are explanatory drawings using rack approximation to show the manner in which the external teeth 34 and the internal teeth 24 mesh with the tooth profiles designed as described above. FIG. 7(a) is obtained at the position of the open end part 34a of the external teeth 34, FIG. 7(b) at the principal cross-section position of the external teeth 34, and FIG. 7(c) at the position of the inner end part 34b of the external teeth 34. As can be seen, albeit approximately, from these movement loci, the external teeth 34 of the flexible externally toothed gear 3 make sufficient contact with the internal teeth 24 in different positions from the open end part 34a, through the principal cross-section position, up to the inner end part 34b.

As described above, in the strain wave gearing 1, the addendum tooth profile of the flexible externally toothed gear 3 makes double contact with the dedendum tooth profile and the addendum tooth profile of the rigid internally toothed gear 2, and the addendum tooth profile of the rigid internally toothed gear 2 makes double contact with the dedendum tooth profile and the addendum tooth profile of the flexible externally toothed gear. Therefore, not only to the addendum tooth profiles of the two gears 2, 3 continuously mesh together, but the gears can mesh over a wider range. It is thereby possible to achieve a strain wave gearing capable of transmitting greater torque.

The invention claimed is:

1. A strain wave gearing having a double-contact negative deflection tooth profile, the strain wave gearing comprising:
a rigid internally toothed gear, a flexible externally toothed gear coaxially disposed on an inner side of the internally toothed gear, and a wave generator fitted to an inner side of the externally toothed gear;
the flexible externally toothed gear being made to flex into an ellipsoidal shape by the wave generator and external teeth of the ellipsoidally flexed flexible externally toothed gear being meshed with internal teeth of the rigid internally toothed gear at both ends in a major axis direction of the ellipsoidally flexed flexible external gear;
the rigid internally toothed gear and the flexible externally toothed gear prior to ellipsoidal deformation both being spur gears having a module m;
a number of teeth of the flexible externally toothed gear being 2n fewer than a number of teeth of the rigid internally toothed gear where n is a positive integer;
an amount of flexure with respect to a rim neutral circle prior to flexure being 2κmn, where κ is a flexure coefficient, at a major axis position in an ellipsoidal rim neutral line of the flexible externally toothed gear in an axially perpendicular cross-section at any position in a tooth trace direction of the external teeth;
the external teeth having a negative deflection tooth profile with a flexure coefficient κ such that 0<κ<1;
the internal teeth having an addendum tooth profile defined by a first homothetic curve and a dedendum tooth profile defined by a first-tooth-profile-creating curve;
the external teeth having an addendum tooth profile defined by a second homothetic curve and a dedendum tooth profile defined by a second-tooth-profile-creating curve;
the first and second homothetic curves being obtained on the basis of a movement locus of the external teeth relative to the internal teeth while the wave generator rotates, at different positions of the external teeth in the tooth trace direction, when the meshing of the external teeth and the internal teeth is approximated with rack meshing;
the first homothetic curve being a curve segment from one vertex to the next bottom point of the movement locus, and a first curve segment from an inflection point to the bottom point in the curve segment being derived by scaling down by a ratio λ, wherein 0<λ<1, with the bottom point as the homothetic center;
the second homothetic curve being derived by scaling, by a ratio (1−λ)/λ using an end point of the first homothetic curve BC as the homothetic center, of a curve obtained by 180 degree rotation of the first homothetic curve about the end point on the side opposite the bottom point in the first homothetic curve;
the first-tooth-profile-creating curve being created in the internal teeth in the process of the addendum tooth profile of the external teeth, defined by the second homothetic curve, moving from the inflection point of the movement locus to the vertex in the movement locus; and
the second-tooth-profile-creating curve being created in the external teeth when the addendum tooth profile of the internal teeth, defined by the first homothetic curve, moves from the inflection point to the vertex.

2. The strain wave gearing, according to claim 1, wherein the flexible externally toothed gear has a flexible cylindrical barrel part and a diaphragm extending radially from a rear end of the cylindrical barrel part, and the external teeth are formed in an external peripheral surface portion of the cylindrical barrel part on a side of a front-end opening thereof;
an amount of flexure of the external teeth increases along the tooth trace direction from an inner end part on the same side as the diaphragm toward an open end part on the same side as the front-end opening, in proportion to a distance from the diaphragm;
when any position of the external teeth in the tooth trace direction between the open end part and the inner end part is designated as a principal cross-section position, the tooth profile of the external teeth in the principal cross-section position is a basic external tooth profile defined by the first homothetic curve and the first-tooth-profile-creating curve;
the tooth profile shape of the external teeth in a position in the tooth trace direction other than the principal cross-section position is an addendum-modified tooth profile, obtained by applying an addendum modification according to the amount of flexure to the basic external tooth profile;
the tooth profile shape of the external teeth in different positions in the tooth trace direction from the principal cross-section position to the open end part is obtained by applying an addendum modification so that a vertex of a movement locus described by the basic external tooth profile in the different positions is tangent to the vertex of the movement locus in the principal cross-section position; and
the tooth profile shape of the external teeth in different positions in the tooth trace direction from the principal cross-section position to the inner end part is obtained by applying an addendum modification so that a vertex of a movement locus described by the basic external tooth profile in the different positions is tangent to the bottom part of the movement locus in the principal cross-section position.

3. The strain wave gearing according to claim 1, wherein corrections are made to both the dedendum tooth profile of the internal teeth and the dedendum tooth profile of the external teeth so as to preserve a desired clearance between the opposing addendum tooth profiles.

4. The strain wave gearing according to claim 2, wherein corrections are made to both the dedendum tooth profile of the internal teeth and the dedendum tooth profile of the external teeth so as to preserve a desired clearance between the opposing addendum tooth profiles.

* * * * *